United States Patent [19]
Charrue

[11] Patent Number: 5,804,317
[45] Date of Patent: Sep. 8, 1998

[54] PROCESS FOR REINFORCING GLASS OBJECTS

[75] Inventor: Herve Charrue, Rueil-Malmaison, France

[73] Assignee: Saint-Gobain Vitrage International, Courbevoie, France

[21] Appl. No.: 362,447

[22] PCT Filed: May 4, 1994

[86] PCT No.: PCT/FR94/00516

§ 371 Date: Feb. 23, 1995

§ 102(e) Date: Feb. 23, 1995

[87] PCT Pub. No.: WO94/26675

PCT Pub. Date: Nov. 24, 1994

[30] Foreign Application Priority Data

May 6, 1993 [FR] France ................................. 93/05390

[51] Int. Cl.$^6$ ....................................................... B32B 17/00
[52] U.S. Cl. ........................ 428/410; 428/426; 65/30.14; 65/31; 65/60.1
[58] Field of Search ..................................... 428/409, 410, 428/426; 65/31, 30.14, 60.1

[56] References Cited

U.S. PATENT DOCUMENTS

| | | | |
|---|---|---|---|
| 3,628,934 | 12/1971 | Duthoit | 65/30 |
| 3,816,222 | 6/1974 | Plumat | 161/1 |
| 4,236,909 | 12/1980 | Thomas | 65/115 |
| 4,400,194 | 8/1983 | Starr | 65/114 |
| 4,471,024 | 9/1984 | Pargamin | 65/30.14 |
| 4,911,743 | 3/1990 | Bagby | 65/31 |
| 5,397,647 | 3/1995 | Kramling | 428/426 |

*Primary Examiner*—Timothy M. Speer
*Attorney, Agent, or Firm*—Oblon, Spivak, McClelland, Maier & Neustadt, P.C.

[57] ABSTRACT

The invention relates to a process for reinforcing a glass object by precompressing the surface of the object, acid etching said surface to a depth equal to or less than the compressed depth of the glass, and finally protecting the etched surface.

20 Claims, No Drawings

PROCESS FOR REINFORCING GLASS OBJECTS

The invention relates to procedures for increasing the mechanical strength of glass objects, particularly flat or curved glass plates. It in particular applies to aircraft glazings or more generally to all cases where a high mechanical strength must be ensured.

It is known that the mechanical strength of a glass object can be increased by a tempering operation consisting of placing the surface of the object under compression beforehand either thermally or chemically by an ion exchange process, which leads to the surface replacement of part of the sodium ions by larger ions such as e.g. potassium ions, which thus place the surface of the object under compression.

The final mechanical strength obtained is obviously dependent on the type of tempering treatment performed, but also on the quality of the surface prior to the treatment of the object. In the case of a glass plate, the most important surface defects are essentially encountered close to edges which have undergone a cutting treatment. It is certainly possible to minimize this problem by a high-quality polishing of the edges, e.g. using a so-called polished, full round edge method, but this treatment is relatively complicated and there is always a risk of part of the edges being incompletely polished. Moreover, the defects are not solely located on the edges, even when the glass is obtained by a process not normally requiring any making good by machining and in particular by the presently most widely used process, namely the float process, or other standard processes such as the fusion draw process, the Fourcault process or rolling processes with or without marks.

Thus, on measuring the mechanical strength of a large number of tempered plates, there is found to be relatively wide dispersion of the effective tempering levels and that even if the mean value is significantly higher than the mean value of the mechanical strength of an untempered plate, certain plates still have mechanical strength values substantially identical to the initial mechanical strength. Moreover, the breaking stress levels can sometimes, particularly in the case of very large plates, such as e.g. those intended for aircraft windscreens, prove inadequate for the envisaged application.

It is in particular known from FR-A-2 138 710 or its equivalent U.S. Pat. No. 3,843,472 to reinforce a glass article by smoothing by an abrasion process part of the surface and/or edge, which then undergoes, before and/or after the chemical tempering of the glass, to a so-called grinding treatment by means of an acid agent such as an aqueous solution of hydrofluoric acid and optionally sulphuric acid. The shock resistance obtained by the combination of the abrasion treatment and the grinding treatment is superior to that obtained when only one of the treatments is performed prior to the thermal tempering and well above that obtained when the glass only undergoes a grinding using hydrofluoric acid.

Thus, hydrofluoric acid grinding alone does not make it possible to eliminate major surface defects because the etching is not selective. The concave parts of the defects are reached in the same way and the convex parts, so that essentially there is only a reproduction by translation of the geometry of the glass surface and consequently that of the defects. However, a slight, but not usually significant gain is obtained, because the treatment makes it possible to slightly widen the defects and therefore the mechanical strength is slightly increased.

In order to be effective, the known process of the aforementioned patent requires a careful abrasion with a treatment of the edges by a succession of flexible abrasive belts, which are oriented differently and which differ by the nature and size of the grains used. Such a treatment takes a long time and must be carried out by particularly skilled workers, without it being possible to check the quality of the treatment by any tests which are not destructive and this can obviously not be performed in a systematic manner.

Moreover, although it is true that most defects are produced by cutting operations and are therefore located on the edges, the main faces of the glass objects are still not perfect, even in the case of a process requiring no machining of the faces, such as the float process. However, it is possible to attempt to obviate this by polishing, but once again it is a long and costly supplementary treatment, where the slightest error can give rise to defects worse than those which it is aimed to eliminate. Any supplementary manipulation of the glass can lead to the formation of new defects. It is therefore agreed that articles forming the object of such reinforcing treatments are those for which the quality requirement is very high from the very first production stage, so that the number of defects is lower than for a more ordinary product.

Under these conditions, certain of the objects produced have poor mechanical strengths and even if it is statistically rare, it is nevertheless true that these few cases constitute a major problem when it is a question of producing an aircraft wind-screen or a high-security, armoured glazing.

The present invention is directed at an industrial process for increasing the mechanical strength of glass objects of random sizes, over the entire surface thereof, no matter whether or not they have undergone machining of the edges, whilst making it possible to obtain particularly high breaking stress levels and more especially a limited dispersion of the mechanical strength values, particularly with respect to the low points.

According to the invention this object is achieved by a reinforcing process consisting of the prior compressing of the surface of a glass object, an acid etching of said surface over a depth equal to or below the compressed glass depth and a protection of the surface treated by acid etching.

Thus, the process according to the invention consists of the combination of a tempering pretreatment of the object surface, either thermally or chemically, followed by an acid etching of the surface, which is subsequently protected either extrinsically by a protective layer, or, in preferred manner, intrinsically by a further tempering.

The prior compression of the surface of the object also ensures the compression prestress of defects limiting as a result of this the diffusion to the bottom of the crack of acid and therefore the relative elongation of the defect with respect to the etched surface. Finally, this leads to a reduction in the size of the defect to that ensuring a very significant breaking stress increase, but which is still a function of the tested surface.

The prior compression pretreatment is carried out in such a way as to ensure a compressed layer having an adequate prestress amplitude and depth with respect to what is considered to be the largest probable defect on the considered surface, said defect size being proportional to the surface and, for the edges, is dependent on the type of working used (abrasive belt, diamond grinding wheel, etc.). The depth removed by the acid will be a direct function of the size of the largest estimated defect on the surface and in the limiting case could reach the depth of the compressed layer.

The pretreatment has both a purely mechanical function, namely ensuring a compression prestress, and a chemical function, because it is able to ensure a homogenization of the etching front coupled with the mechanical prestress. The inventors have found that the higher the etching kinetics, i.e. the ablation speed for a given surface, the greater must be the prestress. Correlatively, for weak acid concentrations, a prestress by thermal tempering and therefore of a smaller amplitude than a prestress by the chemical procedure, but affecting a larger depth, makes it possible to obtain results similar to those obtained for a glass which has previously been chemically tempered. However thermal tempering leads to the disadvantage for small surfaces of only having an average geometrical quality, accompanied by a generation of defects during the heating and transportation of the glass before and during tempering. Therefore, said pretreatment is preferably performed by chemical tempering, because it then leads to a significant increase in the number of alkali metal ions on the surface, which tends to limit the etching kinetics by the acid and thus homogenizes the etching front.

Following acid etching, a surface of the virgin surface type is obtained, identical to a freshly formed surface, having very few defects or at least only having defects which are sufficiently small to ensure that the mechanical strength of the surface is very high. However, this property only remains true if no new defects are generated of a sufficiently large size to reduce the mechanical strength once again. However, it is known that a virgin surface is in fact very sensitive and undergoes a very rapid deterioration as soon as it is brought into the presence of any material liable to form a crack. Thus, a simple handling operation giving rise to contacts is sufficient to damage the surface obtained by such a treatment, so that it should be protected.

In a first variant of the invention, said protection is provided extrinsically by the deposition, as from the end of the acid etching, of a mechanical barrier (resistance to scratching/identation) and/or chemical barrier (resistance to corrosion by water, acids, etc.) deposited under clean conditions ensuring the absence of hard particles between the glass and the deposit, which could give rise to indentations during use. These protective deposits can be in the form of polymers, mineral and/or organic layers, of a metallic nature, etc. Preferably, these layers are directly formed on the surface of the object, but it would also be possible to use films, particularly polyurethane films, provided that a stoving took place (the film must e.g. be heated to about 100° C.) under particularly strict cleanness conditions.

Preferably, the metallic oxide layers are constituted by $Ta_2O_5$-type layers, which are known to have a good mechanical strength and as polymer films are used polyurethane films, particularly a crosslinked polyurethane, e.g. deposited by dip coating or, in preferred manner, by spraying. It is also possible to use polyvinyl butyral films, but they are not generally preferred due to their hydrophilic character.

Polymer films, and in the same way metallic or metal oxide films, deposited for the protection of the glass surface after acid etching can also fulfil an advantageous function in the final glazing. Thus, polyurethane films can have an action against scratching, can be able to maintain in place glass splinters in the case of the glazing being shattered, can absorb stresses, or can serve as an interface between the glass and an assembly polymer film such as a polyvinyl butyral film, particularly with a view to reducing the cold spalling effect due to the expansion difference at low temperature between the glass and the polyvinyl butyral. Moreover, if said polyurethane film is deposited on the six faces of the glass sheets, it permits a true encapsulation thereof, which in itself constitutes a very good protection.

In a second and more particularly preferred variant of the invention, said protection is obtained intrinsically by applying a new reinforcement to the glass. This reinforcement is preferably obtained by a chemical tempering, ensuring that the latter is performed just after the chemical etching and limiting the heating time prior to immersion in the chemical reinforcement bath, maintaining at a high temperature causing a reduction of the intrinsic strength of the etched surface by activating corrosion kinetics at the bottom of the crack which were previously reduced. This leads to a product having all the handling advantages of conventional, chemically reinforced products, as well as their resistance to damage, the latter being a direct function of the exchanged depth and the installed mechanical prestress. It is also possible to protect the glass plate by a thermal tempering, but if it is wished to retain the integrity of the two surfaces, it is necessary to proscribe the conveying of the glass on rollers and ensure the heating and tempering either by an air cushion system, or between grippers, or any other process limiting contact.

It is sometimes simpler to protect the glass immediately following the acid etching in an extrinsic rather than an intrinsic manner, but the protection obtained is less, except when using a thin film polymer, which limits the applications of the treated object, because the polymer film is not always able to withstand a use on the external face.

An interesting use of the extrinsic protection can be in the form of a provisional protection, having a limited, but adequate life in order to be able to install an intrinsic protection of the chemical reinforcement type.

It should be noted that on directly carrying out an acid etching (followed by tempering) without any reinforcing pretreatment by thermal or chemical tempering, it is possible to obtain, if the acid concentration is well chosen, a very high, final strength of the product. However, it should be noted that the dispersion of the results (lowest, respectively highest level of a treated batch of samples) is increased when the etching speed increases, whereas the mean value of the breaking stress decreases. The absence of a reinforcing pretreatment by thermal or chemical tempering does not make it possible to obtain on a given glass batch, a minimum mechanical strength exceeding that of the initial glass and therefore uniformity of the chemical etching between the surface and large defects. However, the mechanical strength values are as high as with a reinforcing pretreatment. Only the dispersion is greater and does not make it possible to ensure a minimum, mechanical strength value greater than that of the basic glass.

Certain applications require a minimum strength value well above that of the initial glass, by reducing the lower limit of the dispersion, which can only be ensured by the chemical or thermal reinforcement/additives+hydrofluoric acid etching/chemical or thermal reinforcement or protection by mechanical/chemical barrier layer deposition.

It should also be noted that the addition of different additives, such as sulphuric acid, makes it possible to obtain the initial optical quality of the glass and improve it if appropriate. It is more particularly advantageous to use an etching solution containing surfactants, which render the etching uniform.

Other advantageous features and details of the invention can be gathered from the comparative tests summarized hereinafter, all performed on the basis of float glass plates, whose chemical composition is in accordance with the following formulation, expressed in weight percentages:

| | |
|---|---|
| SiO$_2$ | 71.7 |
| Al$_2$O$_3$ | 0.6 |
| CaO | 9.5 |
| MgO | 4 |
| Na$_2$O | 13.6 |
| So$_3$ | 0.2 |
| Miscellaneous | 0.4 |

Moreover, the sum of the components individually in weight percentages is below 0.1%.

300×150×6 mm panels were cut with a diamond reel and the edges underwent a mechanical abrasion either simply of the "dropped edges" type, the treatment normally applied to any cut glazing so as to prevent it from injuring the worker and which consists of giving a bevelled profile with three canted corners, or of the "polished, full round edge" type, i.e. the edge of the glass is completely rounded in order to be shaped like a circumferential portion, the treatment being completed by polishing with alumina.

Chemical tempering (TC) was carried out by placing the panels in a potassium nitrate bath at 460° C. and for 48 hours. The exchanged depth is approximately 40 to 60 microns.

The acid etching is performed with the aid of an aqueous 2.4% by volume hydrofluoric acid solution at a temperature of 24° C. For etching a depth of approximately 80 microns, the etching is carried out for 4 hours.

The results obtained are given in the following table:

| Preparation of edges | Treatment | Strength |
|---|---|---|
| None (before cutting) | — | 100 MPa |
| Polished, full round edge | TC | 100–350 MPa |
| Dropped edges | TC | 300 MPa |
| Dropped edges | HF | 60–800 MPa |
| Dropped edges | HF + TC | 120–130 MPa |
| Dropped edges | TC + HF | 300–800 MPa |
| Dropped edges | TC + HF + TC | 480–650 MPa |
| Polished, full round edge | TC + HF + TC | 450–350 MPa |

In the two latter cases, it should be noted that the mean strength measured is approximately 550 MPa, i.e. exceptionally high. It should also be noted that the polishing of the edges (polished, full round edge) does not lead to an increased strength and it is therefore pointless to carry out such a treatment, which is much more expensive than the mere dropping or reduction of the edges. This represents an important difference with the results obtained in the prior art by thermal tempering only, the dropped edge method being virtually unusable when there is a large number of breakages (even if certain glazings obtained have a strength of approximately 300 MPa, most of the glazings must be considered as having a strength of 0 MPa due to the breakage). In particular, it is possible to obtain objects having a strength exceed ing 200 MPa for a thickness of 3 mm, with a thickness under compression of more than 600 microns. For comparison, a standard car glazing, which has undergone a thermal tempering has a strength of approximately 100 to 150 MPa, for the same thickness under compression, whereas a chemical tempering does not generally make it possible to obtain an exchange depth exceeding 100 microns.

It should be noted that the glass composition referred to hereinbefore corresponds to an "ordinary" window glass composition of the soda-lime glass type, i.e. not optimized for a chemical tempering and the mechanical strengths obtained by the process according to the invention are significantly higher when use is made of bases produced because of their suitability for higher tempering levels.

In this connection reference is e.g. made to a glass, whose composition is defined by the following weight percentages:

| | |
|---|---|
| SiO$_2$ | 65 to 76 |
| B$_2$O$_3$ | 0 to 4 |
| Al$_2$O$_3$ | 1.5 to 5 |
| MgO | 4 to 8 |
| CaO | 0 to 4.5 |
| Na$_2$O | 10 to 18 |
| K$_2$O | 1 to 7.5 |

These elements representing at least 96% of the weight of the glass and also respecting the weight ratios CaO:CaO+ MgO between 0 and 0.45 and K$_2$O/K$_2$O+Na$_2$O between 0.05 and 0.35, such compositions make it possible to obtain high reinforcements for large change depths.

The process according to the invention has numerous applications. It can certainly be used for treating glass plates, but also for treating other objects such as bottles.

If the reinforcement treatments are of the thermal tempering type, particularly high thickness depths under compression are obtained, which are combined with remarkably high stress levels for this type of tempering.

I claim:

1. A process for the reinforcement of a glass object, comprising:

acid etching of a previously compressed surface of said object over a depth equal to or greater than the compressed glass depth, and final protection of the etched surface.

2. Process according to claim 1, characterized in that said protection is obtained intrinsically by a thermal or chemical tempering treatment.

3. Process according to claim 1, characterized in that said protection is obtained extrinsically by depositing a layer.

4. Process according to claim 3, characterized in that the object subsequently undergoes a chemical tempering treatment.

5. The product produced by the process of claim 4.

6. Process according to claim 1, characterized in that the acid etching is performed with an agent containing hydrofluoric acid.

7. Process according to claim 6, characterized in that said agent also contains surfactants.

8. The product produced by the process of claim 1.

9. The process according to any one of claims 2, 3, 4 or 1, wherein said previously compressed surface has been compressed by thermal tempering.

10. The process according to any one of claims 2, 3, 6, 4 or 1, wherein said previously compressed surface has been compressed by chemical tempering.

11. A process for reinforcing a glass object, comprising:

compressing a surface layer of a glass object;

etching said glass object, at least through said surface layer, thereby exposing a new surface; and protecting said new surface intrinsically or extrinsically.

12. The process of claim 11, wherein said protecting comprises compressing said new surface.

13. The process of claim 12, wherein said compressing of said new surface is chemical tempering.

14. The product produced by the process of claim 13, wherein said glass object has a strength exceeding 450 MPa.

15. The process of claim 11, wherein said compressing of said surface layer is chemical tempering.

16. The process of claim 11, wherein said protecting of said new surface comprises depositing a layer on said new surface.

17. The process of claim 16, further comprising subsequent chemical tempering.

18. The product produced by the process of claim 11.

19. A tempered, etched and protected glass object, whose strength exceeds 200 MPa for a thickness of 3 mm.

20. A chemically tempered, etched and protected glass object, whose strength exceeds 450 MPa.

* * * * *